United States Patent
Mundra et al.

(10) Patent No.: US 7,453,889 B2
(45) Date of Patent: Nov. 18, 2008

(54) INTEROPERABILITY OF ADPCM ENCODED VOICE COMMUNICATIONS

(75) Inventors: Satish Kumar M. Mundra, Germantown, MD (US); Daniel C. Thomas, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 700 days.

(21) Appl. No.: 11/047,746

(22) Filed: Feb. 2, 2005

(65) Prior Publication Data

US 2006/0171372 A1 Aug. 3, 2006

(51) Int. Cl.
*H04L 12/28* (2006.01)
*H04L 12/56* (2006.01)
*H04J 3/16* (2006.01)
*H04J 3/22* (2006.01)

(52) U.S. Cl. .................. 370/400; 370/401; 370/465; 370/466; 370/467; 370/476

(58) Field of Classification Search .................. 370/352, 370/355, 356, 389, 400, 401, 466, 467; 379/88.17
See application file for complete search history.

(56) References Cited

U.S. PATENT DOCUMENTS

| | | | | |
|---|---|---|---|---|
| 3,772,682 A * | 11/1973 | Flanagan | ...................... | 341/75 |
| 5,329,555 A * | 7/1994 | Marko et al. | ................. | 375/347 |
| 5,550,837 A * | 8/1996 | Chang | ......................... | 714/708 |
| 6,430,164 B1 * | 8/2002 | Jones et al. | .................. | 370/313 |
| 6,785,730 B1 * | 8/2004 | Taylor | ......................... | 709/230 |
| 2005/0163052 A1 * | 7/2005 | Savage et al. | ............... | 370/241 |
| 2006/0034260 A1 * | 2/2006 | Svedberg et al. | ............ | 370/352 |
| 2006/0171324 A1 * | 8/2006 | Mundra et al. | .............. | 370/252 |

* cited by examiner

*Primary Examiner*—Daniel J Ryman
*Assistant Examiner*—Cassandra Decker
(74) *Attorney, Agent, or Firm*—Steven A. Shaw; W. James Brady; Frederick J. Telecky, Jr.

(57) ABSTRACT

Providing interoperability on a voice communication network by detecting incompatible bit packing payload formats of ADPCM encoded voice data signals in an encoder/decoder. A mismatch of bit packing formats between little endian format and big endian format is determined by detecting the occurrence of ADPCM code words of interest in the decoded voice data stream out of the encoder/decoder. The invention may be applied to an ITU G.726 encoder/decoder.

19 Claims, 3 Drawing Sheets

US 7,453,889 B2

INTEROPERABILITY OF ADPCM ENCODED VOICE COMMUNICATIONS

CROSS-REFERENCE TO RELATED APPLICATIONS

None

FIELD OF THE INVENTION

The present invention relates to using a call flow for detecting and resolving interoperability problems between a single voice codec using different payload formats. The invention can be applied to International Telecommunications Union (ITU) G.726 interoperability issues.

BACKGROUND OF THE INVENTION

In typical telecommunications systems, voice calls and data are transmitted by carriers from one network to another network. Networks for transmitting voice calls include packet-switched networks transmitting calls using voice over Internet Protocols (VoIP), circuit-switched networks like the public switched telephone network (PSTN), asynchronous transfer mode (ATM) networks, etc. Recently, voice over packet (VOP) networks are becoming more widely deployed. Many incumbent local exchange and long-distance service providers use VoIP technology in the backhaul of their networks without the end user being aware that VoIP is involved.

An example of networks and components for a VoIP call is illustrated in FIG. 1. The diagram shows a communication network that could be any managed network accessing the Internet such as an packet network with IP protocols, Asynchronous Transfer Mode (ATM), or Ethernet network. The communications network comprises a router 14 connected to various customer premise equipment and to media gateway 12. Media gateway 12 must be capable of detecting changing resource or network conditions. The ability to detect and monitor changing resource and network conditions can result in significant cost reductions and/or improved quality. Router 14 is connected to Internet Access Device (IAD) 16, wireless access point (AP) 22, and/or IP PBX (personal branch exchange) 23. A voice call may be placed between any of the customer equipment phones 18 connected to IAD 16, wireless IP phone 24 connected to AP 22, or IP PBX phone 30 and POTS (plain old telephone system) phone 32. Using special software, calls could also be placed through computer 20 connected to IAD 16 or portable computer 26 connected to AP 22.

Customer equipment is connected through access the broadband network 28 to the Internet 34 by media gateway 12. On the far end is the PSTN 48 connected to a POTS phone 52 through a Central Office 50. The PSTN 48 is also connected to the Internet 34 through a trunk gateway, composed of a signal gateway 46, a media gateway controller/proxy (MGC) 32, and a trunk media gateway (MG) 42. The IP and packet data (e.g., real time protocol (RTP packet data)) associated with the call is routed between the IAD 16 and the trunk MG 42. The trunk gateway system provides real-time two-way communications interfaces between the IP network (e.g., the Internet) and the PSTN 48. As another example, a VoIP call could be initiated between a wireless IP phone (WIPP) 24 and another WIPP 40 connected to AP 38. In this call, voice signals and associated packet data are sent between a MG 12 and a MG 36 through Internet 34, thereby bypassing the PSTN 48 altogether.

Factors that affect voice quality in a VoIP network are fairly well understood. The level of control over these factors will vary from network to network. This is highlighted by the differences between a well-managed small network enterprise verses an unmanaged network such as the Internet. Network operational issues affect network performance and will create conditions that affect voice quality. These issues include outages/failures of network switches, routers, and bridges; outages/failure of VoIP elements such as call servers and gateways; and traffic management during peak periods and virus/denial of service attacks.

Interoperability between VOIP systems is a critical ingredient of high-quality VOIP systems. There are many software and hardware devices in a VOIP system that must be implemented in order to reach the quality of carrier-class systems. The most important software features include echo cancellation, voice compression, packet play-out software, tone processing, fax and modem support, packetization, signaling support, and network management. New networking technologies and deployment models are also causing additional challenges that affect the ability of VoIP service providers to guarantee the highest levels of service quality (e.g., toll quality) in their deployments. Two such examples are where the VoIP service provider does not control the underlying packet transport network, and the use of packet networks with potentially high delay and loss, such as in 802.11 WLAN (Wireless Local Area Network) technology.

A problem affecting the interoperability of VOIP systems, and hence the quality of voice systems, is a problem with interoperability between two widely-used but incompatible packing formats for Real-time Protocol (RTP) loads when using ADPCM. Adaptive Differential Pulse-Code Modulation (ADPCM) is a widely-used coding technique for digital communications over a computer network that uses a method of predictive coding to achieve data reduction. An advantage of ADPCM is a bit rate reduction by the use of an adaptive scale factor and quantizing according to a fixed quantization curve. The result of the incompatible packing formats is garbled audio when a caller implements one of the formats and a receiver implements the opposing format.

One standard is the ITU-T standard G.726, titled "40, 32, 24, 16 kbit/s ADAPTIVE DIFFERENTIAL PULSE CODE MODULATION (ADPCM)," describes an algorithm for conversion of a single 64 kbit/s A-law or mu-law PCM channel encoded at 8,000 samples/s to and from a 40, 32, 24, or 16 kbit/s channel. The conversion is applied to the data stream using ADPCM transcoding methods. The G.726 data rates of 40, 32, 24, and 16 kbit/s have codewords of 5, 4, 3, and 2 bits, respectively, and are described as G726-40, G726-32, G726-24, and G726-16. Samples for G.726 encoding must be packed into octets using "little endian" ordering. Big endian or little endian packing methods indicate packing bytes in a certain order according to what bytes are most significant or least significant. Big endian systems sequence bits where the most significant bit in a sequence is stored at the lowest, or first, storage address, whereas in a little endian format the least significant bit in the sequence is stored first.

For G.726 the 4-bit code words must be packed into octets wherein the first code word is packed in the four least significant bits (LSBs) of the first octet and with the LSB of the code word in the LSB of the octet. The second code word is placed in the four most significant bits (MSBs) of the first octet, with the MSB of the second code word packed into the MSB of the octet. The packing of code words continues in this manner with the first code word of each pair of words placed in the least significant four bits of the octet, and so forth.

The "little endian" method for packing samples into octets in the G726-16, -24, -32, and -40 formats for RTP payloads is the same packing method that is specified in ITU-T Recommendation X.420 for packing ADPCM samples into octets.

Internet Engineering Task Force (IETF) adopted this format for G726-40, -32, -24, -16 RTP payloads.

The opposing packing format is the ITU-T Recommendation I.366.2 Annex E for ATM AAL2 (ATM adaptation layer 2) transport that specifies big-endian format for the same. This has resulted in interoperability problems in the VOIP industry as many vendors have adopted the AAL2 format for RTP payloads too.

The revised AVT-RTP-Profile (RFC 3551) has attempted to resolve this issue by discontinuing the use of payload type "2" for G726-32 and has recommended the use of dynamic RTP payload type. Also for the 1.366.2 (Annex E) format, new MIME (multipurpose Internet mail extension) subtypes of AAL2-G726-16, -24, -32, -40 are specified and MIME registration of the same is expected to happen soon. This probably can solve the problem in some implementations going forward, however, interoperability with the installed base of VOIP devices is not ensured.

G726-32 with dynamic payload is likely to indicate that the payload conforms to IETF specification, however, there is nothing that prevented use of dynamic payload for G726-32 in older implementations. Thus, in many older implementations the type of payload format cannot be determined remotely. Moreover G726-16, -24, and -40 have always used dynamic payloads, so relying on payload alone can result garbled audio.

A gateway compliant with RFC 3551 and implementing G.726 can probably support G726-XX as well as AAL2-G726-XX payload formats. However, when the gateway's session description protocol (SDP) contains G726-XX alone, there is no way for the gateway to determine the payload format conclusively. For some signaling protocols, it may be possible to indicate support for both payload formats. However, there is no method for an existing gateway to determine if the payload format of a remote gateway negotiates using only G726 as described above.

One solution for ADPCM interoperability is proposed in the IETF's RFC 3551 standard "RTP Profile for Audio and Video Conferences with Minimal Control," by Schulzrinne, H. and Casner, S. (July, 2003). RFC 3551 has only solved the issue for interoperability among future systems. As far as currently existing systems in the field are concerned the gateways can not determine the payload format conclusively. Clearly, there is a need for gateway to determine the G.726 payload format conclusively to prevent garbled audio output when it encounters compliant systems.

SUMMARY

To overcome the drawbacks of the prior art, the present invention solves the problem of G.726 RTP interoperability by building intelligence in a digital signal processor (DSP) or software to detect the endian format of G726 payloads and switch formats at a gateway to a single format when incompatible formats are detected. A preferred method uses a software package such as a Call Agent that can facilitate bit packing format verification of either G.726 or AAL2-G726-XX payload formats.

An advantage to the invention is that it provides seamless interoperability for VOIP systems using G.726 protocols with that have legacy systems using AAL2-G726-XX payload formats, and vice-versa.

BRIEF DESCRIPTION OF THE DRAWINGS

For a better understanding of the nature of the present invention, its features and advantages, the subsequent detailed description is presented in connection with accompanying drawings in which.

DETAILED DESCRIPTION OF THE INVENTION

Figure 1:
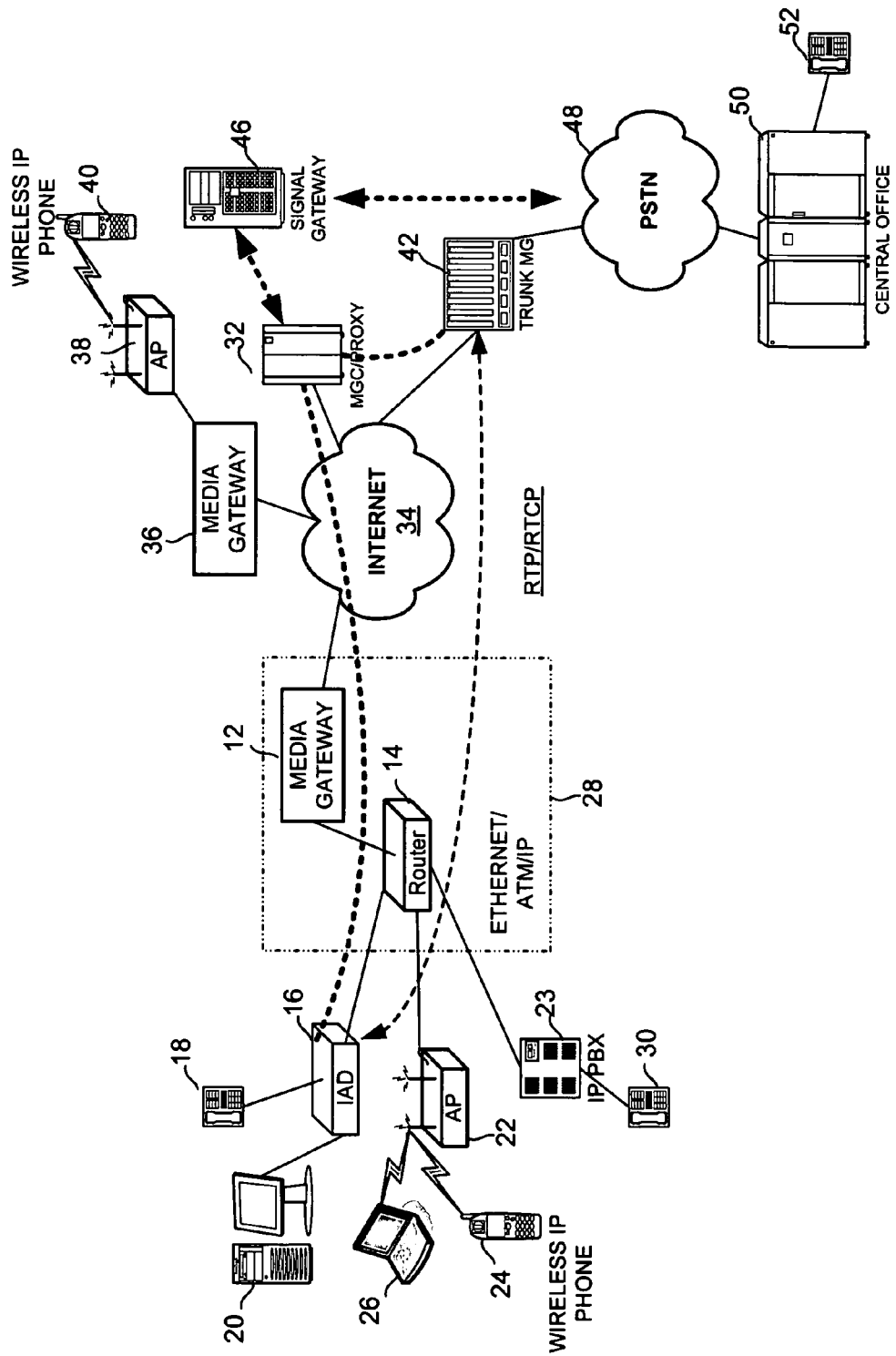
FIG. 1 is a diagram of a packet network using voice over Internet Protocols (VOIP)
Figure 2:
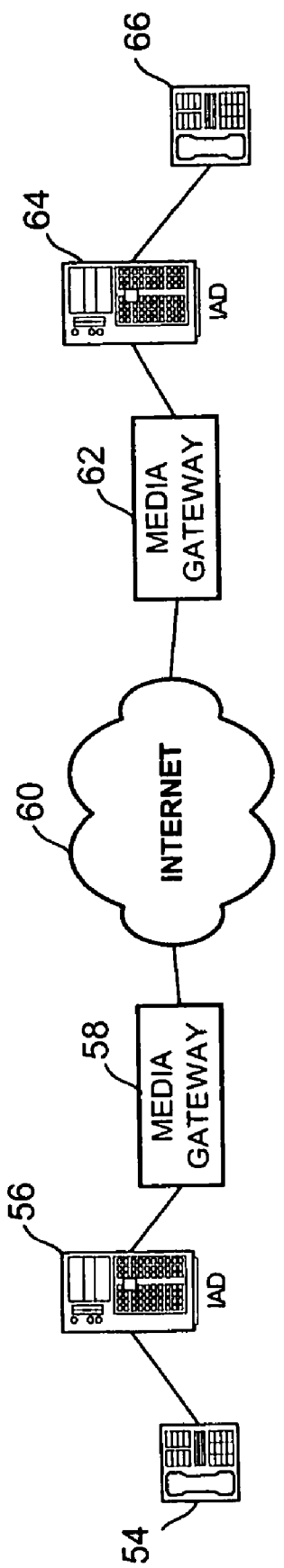
FIG. 2 is a network diagram illustrating gateway devices implementing the signaling protocol of the preferred embodiment.

The present invention provides a system and method for interoperability between the RTP payload formats using ITU G.726 encoding method using little endian ordering for ADPCM and the RTP payload formats specified in ITU-T 1.366.2 Annex E for ATM AAL2 transport that uses big endian ordering. A system for the preferred embodiment for is represented in the network diagram of FIG. 2. The diagram depicts a network used for placing a call using voice over Internet Protocol (VOIP) between IP phone 54 at one end and IP phone 66 at the other end. IP phone accesses the Internet 60 through Internet Access Device (IAD) 56 and media gateway 58. IAD 56 may be any device used for accessing the Internet such as a modem, T1/T5 line, etc., as is known in the art. Gateway 58 is a gateway implementing ADPCM protocols with voice data samples packed into octets using little endian methods in the G.726-16, -24, -32, or 40 payload formats specified consistent with ITU X.420 recommendations.

On the other end of the network, IP phone 66 accesses the Internet 60 through Internet Access Device (IAD) 64 and media gateway 62. IAD 64 may be any device used for accessing the Internet such as a modem, T1/T5 line, etc., as is known in the art. Gateway 62 is a gateway implementing ADPCM protocols with voice data samples packed into octets using big endian methods for RTP payload formats in the ITU I.366.2 Annex E standards for ATM AAL2 transport.

Figure 3:
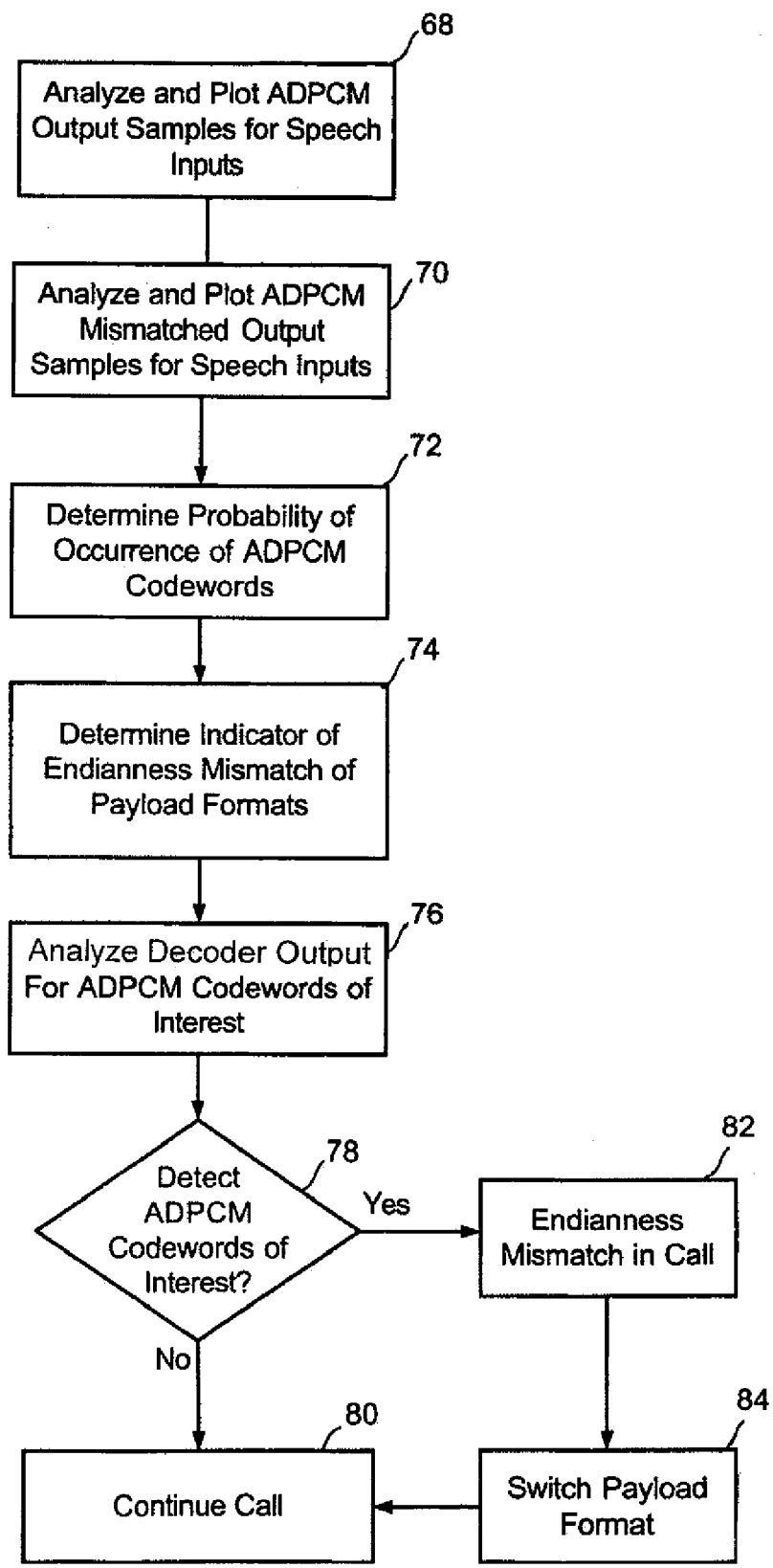
FIG. 3 is a flowchart diagram of the method of the preferred embodiment for determining ADPCM interoperability.

The method of the preferred embodiment is illustrated in the flowchart diagram of FIG. 3. By analyzing the output of a decoder, such as the ITU G.726 decoder, that is embedded in a DSP the bit packing direction of the decoded voice data may be determined. This analysis allows the determination of whether a mismatch of the endianness of the payload formats has occurred and allows the user's VOIP network to switch bit packing directions of the mismatched call.

In step 68, ADPCM outputs of a decoder for three different speech inputs were recorded and plotted in a histogram for analysis. To collect the data, three different speech samples were recorded. The three samples were silence, human speech (e.g., such as speaking numbers 1,2,3 into handset), and a single frequency (e.g., 2600 HZ) tone at a higher end of the toll quality speech spectrum.

In step 70, a nibble reversal is performed on the above ADPCM outputs. Nibble reversal causes an endianness mismatched output to occur. When Nibble mismatch between encoder and decoder occurs, a decoder would observe an encoder ADPCM code words histogram.

After plotting the ADPCM code words and nibble reversed ADPCM code words, the results are analyzed to determine an indicator of bit packing mismatch. The results of analyzing the histogram data indicate that certain ADPCM code words of interest have either a low or a high probability of occurrence depending on whether the endianness of the output is mismatched. As illustrated, the process will analyze 68 and plot ADPCM output samples for speech inputs, and analyze 70 and plot ADPCM mismatched output samples for speech inputs. The next step 72 determines a probability of occurrence of ADPCM code words 0111 and 1000 in ADPCM encoded speech for all three speech input cases. The results indicate that the probability of occurrence is below 0.1%. When nibble or endianness mismatch is encountered the probability of occurrence of ADPCM code words 0111 and 1000 is above 10%. Table 1 below summarizes these results.

TABLE 1

| Input ---><br>32K ADPCM<br>Codewords | Silence | Endianness<br>Mismatch | Speech | Endianness<br>Mismatch | Tone<br>2600 | Endianness<br>Mismatch |
|---|---|---|---|---|---|---|
| 0111 | 0.0029 | 0.1704 | 0.0085 | 0.1696 | 0.0042 | 0.1269 |
| 1000 | 0.0004 | 0.1803 | 0.0023 | 0.1605 | 0.0076 | 0.1305 |

From Table 1 and histogram plots of ADPCM code words, it is concluded that observing the frequency of ADPCM code words 0111 and 1000 for a few 10's of milliseconds at a decoder would enable the decoder to determine the endian mismatch conclusively. Although the above test data was performed for 32K ADPCM, it is understood that the test could be extended to other ADPCM rates, such as 16, 24 or 40 Kbps.

Once the determination of probability thresholds of occurrence of the ADPCM code words of interest in the decoded voice outputs is made, this knowledge is then applied to an actual received call through a G.726 voice decoder. As illustrated, the process can analyze 76 decoder output for ADPCM codewords of interest. The G.726 voice decoder output stream is searched continually to detect 78 the occurrence of ADPCM code words 0111 and 1000. If both of the code words 0111 and 1000 are detected above the threshold, then there is an endianness mismatch in the call 82, and the output stream has a high probability that the call is experiencing a mismatch in the endian format of the voice data payloads.

After mismatch in the endian format is detected 82, the decoder can switch its own decoding and encoding operations to solve the endian packing problem. The process of the preferred embodiment may be further refined to determine exact thresholds for switching. A decision would be further revised based on wider input speech samples and analyzing the distribution of code words themselves enabling implementation to determine the interoperability issue in the least possible amount of time. If the endianness mismatch in the call is detected, the payload format is switched 84 to the payload format that is consistent with the format being transmitted by the remote gateway, namely G726 little endian or AAL2-G726 big endian. The call can then be continued 80 without the problem of interoperability.

Of course, if the ADPCM code words of interest are not detected 78 in the decoder output, then there is a high probability that the caller and receiver do not have an endianness problem with the bit packing order. Thus, the call continues 80 uninterrupted.

It is clear from the problem description above that there is a significant need to solve the ADPCM interoperability issue. If the problem is not solved, a useful, low complexity compression scheme with toll quality may become extinct. The DSP solution of the preferred embodiment is simple and reliable for implementing in DSP or microprocessor and does not require any significant MIPs or memory.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed:

1. A method to determine bit packing format in a voice data stream encoded with adaptive differential pulse-code modulation (ADPCM), comprising:

receiving, into a voice encoder/decoder, voice data signals encoded with ADPCM, wherein payloads of said voice data signals are formatted according to a first bit packing format;

determining if said first bit packing format is compatible with a second bit packing format used by said voice encoder/decoder by detecting the occurrence of ADPCM code words of interest in said payloads, wherein said ADPCM code words of interest are at least one pair of predetermined nibble reversed code words, if both predetermined nibble reversed code words of the pair occur in said payloads, then it is determined that said first bit packing format is not compatible with said second bit packing format.

2. The method of claim 1, wherein said determining is based upon a threshold probability of said ADPCM code words of interest occurring in said payloads.

3. The method of claim 1, wherein said determining comprises detecting the occurrence of ADPCM code words 0111 and 1000 in said payloads.

4. The method of claim 1, wherein said receiving comprises receiving said voice data signals into an International Telecommunications Union (ITU) G.726 encoder/decoder.

5. The method of claim 1, wherein said receiving comprises receiving said voice data signals comprising said payloads formatted according to one of a little endian and a big endian bit packing format, and said determining comprises determining whether said second bit packing format is compatible with said one of said little endian and said big endian bit packing format.

6. The method of claim 1, further comprising:

determining if a mismatch exists between said first bit packing format and said second bit packing format; and if said mismatch exists, switching, in said encoder/decoder, said second bit packing format to a compatible format to said first bit packing format.

7. The method of claim 2, wherein said threshold probability of said ADPCM code words of interest occurring in said payloads is determined by analyzing prepared voice signals that are decoded by said encoder/decoder.

8. A method to provide interoperability between callers that use different bit packing formats in a voice data stream, comprising:

receiving a call of voice data signals into a first gateway from a second gateway, wherein a coder/decoder in the first gateway uses a first bit packing format, and said second gateway uses one of said first bit packing format and a second bit packing format; and determining if said second bit packing format is compatible with said first bit packing format by detecting the occurrence of ADPCM code words of interest in payloads of said voice data signals, wherein said ADPCM code words of interest are at least one pair of predetermined nibble reversed code words, if both predetermined nibble reversed code words of the pair occur in said payloads, then it is determined that said second bit packing format is not compatible with said first bit packing format.

9. The method of claim 8, wherein said determining is based upon a threshold probability of said ADPCM code words of interest occurring in said payloads.

10. The method of claim 8, wherein said determining comprises detecting the occurrence of ADPCM code words 0111 and 1000 in said payloads.

11. The method of claim 8, wherein said receiving comprises receiving said voice data signals into an International Telecommunications Union (ITU) G.726 encoder/decoder in said first gateway.

12. The method of claim 8, wherein said receiving comprises receiving said voice data signals comprising said payloads formatting according to one of a little endian and a big endian bit packing format, and said determining comprises determining whether said first bit packing format is compatible with said one of said little endian and said big endian bit packing format.

13. The method of claim 8, further comprising:

if said second bit packing format is not combatible with said first bit packing format, then determining if a mismatch exists between said first bit packing format and said second bit packing format; and if said mismatch exists, switching, in said first gateway, said second bit packing format to a compatible format to said first bit packing format.

14. A computer-readable medium comprising instructions for execution by a computer, the instructions including a computer-implemented method to provide interoperability between callers that use different bit packing formats in a voice data stream, the instructions for implementing:

receiving a call of voice data signals into a first gateway from a second gateway, wherein a coder/decoder in the first gateway uses a first bit packing format, and said second gateway uses one of said first bit packing format and a second bit packing format; and determining if said second bit packing format is compatible with said first bit packing format by detecting the occurrence of ADPCM code words of interest in payloads of said voice data signals, wherein said ADPCM code words of interest are at least one pair of predetermined nibble reversed code words, if both predetermined nibble reversed code words of the pair occur in said payloads, then it is determined that said second bit packing format is not compatible with said first bit packing format.

15. The computer readable medium of claim 14, wherein said determining is based upon a threshold probability of said ADPCM code words of interest occurring in said payloads.

16. The computer readable medium of claim 14, wherein said determining comprises detecting the occurrence of ADPCM code words 0111 and 1000 in said payloads.

17. The computer readable medium of claim 14, wherein said receiving comprises receiving said voice data signals into an International Telecommunications Union (ITU) G.726 encoder/decoder in said first gateway.

18. The computer readable medium of claim 14, wherein said receiving comprises receiving said voice data signals comprising said payloads formatting according to one of a little endian and a big endian bit packing format, and said determining comprises determining whether said first bit packing format is compatible with said one of said little endian and said big endian bit packing format.

19. The computer readable medium of claim 14, further comprising:

if said second bit packing format is not combatible with said first bit packing format, then determining if a mismatch exists between said first bit packing format and said second bit packing format; and if said mismatch exists, switching, in said first gateway, said second bit packing format to a compatible format to said first bit packing format.

* * * * *